(12) United States Patent
Platz

(10) Patent No.: US 9,822,463 B2
(45) Date of Patent: Nov. 21, 2017

(54) ELECTRODE AND INSTALLATION FOR ELECTROCHEMICAL MACHINING AND METHOD THEREFOR

(71) Applicant: MTU Aero Engines GmbH, Munich (DE)

(72) Inventor: Albin Platz, Ried-Baindlkirch (DE)

(73) Assignee: MTU AERO ENGINES GMBH, Munich (DE)

( * ) Notice: Subject to any disclaimer, the term of this patent is extended or adjusted under 35 U.S.C. 154(b) by 672 days.

(21) Appl. No.: 13/754,154

(22) Filed: Jan. 30, 2013

(65) Prior Publication Data
US 2013/0193000 A1 Aug. 1, 2013

(30) Foreign Application Priority Data
Jan. 31, 2012 (DE) .................. 10 2012 201 305

(51) Int. Cl.
| | |
|---|---|
| *B23H 3/04* | (2006.01) |
| *B23H 7/22* | (2006.01) |
| *B23H 7/26* | (2006.01) |
| *B23H 9/02* | (2006.01) |
| *C25F 7/00* | (2006.01) |
| *B23H 9/14* | (2006.01) |

(52) U.S. Cl.
CPC .............. *C25F 7/00* (2013.01); *B23H 3/04* (2013.01); *B23H 7/22* (2013.01); *B23H 7/26* (2013.01); *B23H 9/02* (2013.01); *B23H 9/14* (2013.01)

(58) Field of Classification Search
CPC .... B23H 3/04; B23H 7/22; B23H 9/02; C25F 7/00
See application file for complete search history.

(56) References Cited

U.S. PATENT DOCUMENTS

| | | | | |
|---|---|---|---|---|
| 2,764,540 A | * | 9/1956 | Farin et al. ................... | 205/670 |
| 3,247,087 A | * | 4/1966 | Gauthier ...................... | 205/670 |

(Continued)

FOREIGN PATENT DOCUMENTS

| | | |
|---|---|---|
| DE | 1816216 A1 | 10/1969 |
| DE | 2417474 A1 | 10/1975 |

(Continued)

OTHER PUBLICATIONS

Translation of DE 19929023A1 of Ziegler, published in 2000.*

(Continued)

*Primary Examiner* — Brian W Cohen
(74) *Attorney, Agent, or Firm* — Abel Law Group, LLP

(57) ABSTRACT

Disclosed is an electrode arrangement for the defined rounding or deburring of edges of electrically conductive components, in particular turbine components, by means of electrochemical machining with at least one working electrode (5), which has a tubular electrode carrier, through which an electrolyte inflow line (10) is provided, the electrode carrier having on the front end a closure (13, 18), which is arranged such that the electrolyte inflow line in the axial direction of the electrode carrier is closed, and at least one outlet opening (19) being arranged in the radial direction. Also disclosed is a self-centering electrode arrangement and an installation for the defined rounding or deburring of edges of electrically conductive components by means of electrochemical machining with at least one corresponding electrode arrangement and also a method using the electrode arrangements and the described installation.

19 Claims, 9 Drawing Sheets

(56) References Cited

U.S. PATENT DOCUMENTS

| | | | |
|---|---|---|---|
| 3,309,294 A | | 3/1967 | Goodwin |
| 3,384,563 A | * | 5/1968 | Taylor .......................... 205/670 |
| 3,594,298 A | * | 7/1971 | Abt .......................... 204/224 M |
| 3,714,017 A | | 1/1973 | Stark et al. |
| 3,723,268 A | | 3/1973 | Johns et al. |
| 3,928,154 A | | 12/1975 | Andrews |
| 3,970,538 A | | 7/1976 | Lucas |
| 4,468,304 A | | 8/1984 | Hill |
| 4,578,164 A | * | 3/1986 | Matsui et al. ................ 205/670 |
| 5,820,744 A | | 10/1998 | Edwards et al. |
| 7,501,049 B2 | | 3/2009 | Schmidt |
| 2006/0042931 A1 | | 3/2006 | Schmidt |
| 2006/0131184 A1 | * | 6/2006 | Mielke .......................... 205/651 |

FOREIGN PATENT DOCUMENTS

| | | |
|---|---|---|
| DE | 19929023 A1 * | 9/2000 |
| DE | 102004040578 B3 | 9/2000 |
| GB | 703838 B1 | 2/1954 |
| GB | 1164536 A | 9/1969 |
| GB | 1255930 A | 12/1971 |

OTHER PUBLICATIONS

"Tubular, adj. and n.". OED Online. Jun. 2015. Oxford University Press. http://www.oed.com/view/Entry/207206 (accessed Aug. 14, 2015).*

* cited by examiner

ELECTRODE AND INSTALLATION FOR ELECTROCHEMICAL MACHINING AND METHOD THEREFOR

CROSS-REFERENCE TO RELATED APPLICATIONS

The present application claims priority under 35 U.S.C. §119 of German Patent Application No. 10 2012 201 305.9, filed Jan. 31, 2012, the entire disclosure of which is expressly incorporated by reference herein.

BACKGROUND OF THE INVENTION

1. Field of the Invention

The present invention relates to an electrode arrangement and also an installation for the defined rounding or deburring of edges of electrically conductive components, in particular turbine components, and to a corresponding method.

2. Discussion of Background Information

Electrochemical machining (Electro-Chemical Machining ECM) is known for machining electrically conductive components. U.S. Pat. Nos. 4,468,304 and 3,714,017 also disclose the electrochemical machining of turbine parts, turbine parts being intended here to mean not only parts of a turbine in the narrower sense but also components of a gas turbine or of an aircraft engine, which for example also includes compressor components. GB 703 838 and U.S. Pat. No. 3,384,563 also disclose electrode arrangements and methods for the electrochemical rounding of edges. The entire disclosures of the mentioned documents are incorporated by reference herein.

Nevertheless, further improvements of these methods with regard to improving the accuracy of the edge radii to be set and improving the effectiveness are desired.

Accordingly, it would be desirable to provide a further development of the electrochemical machining of edges of components, in particular of turbine components, that allows a defined, exact edge radius to be produced, and allows the production of a corresponding edge radius economically and effectively.

SUMMARY OF THE INVENTION

The present invention provides an electrode arrangement for the defined rounding or deburring of edges of electrically conductive components, in particular turbine parts, by electrochemical machining with at least one working electrode (5). The at least one working electrode comprises a tubular electrode carrier through which an electrolyte inflow line (10) is provided. The electrode carrier has on a front end thereof a closure (13, 18) that is arranged such that the electrolyte inflow line in the axial direction of the electrode carrier is closed. Further, at least one outlet opening is arranged in the radial direction.

In one aspect of the arrangement, a shaped electrode (11) with the negative shape of the edge shape may be arranged on the electrode carrier in extension of the at least one outlet opening.

In another aspect, radially with respect to the longitudinal axis of the electrode carrier, the closure (13, 18) may laterally have at least one sealing body (14) to bear against a component to be machined. For example, the at least on sealing body may be arranged in relation to the outlet opening and the shaped electrode such that, when it is bearing against a component to be machined, it prevents an outflow of the electrolyte between the component and the closure and forces the electrolyte to flow past the shaped electrode.

In yet another aspect of the arrangement of the present invention, the at least one working electrode may be self-centering.

In a still further aspect, the at least one working electrode or an electrode carrier of the at least one working electrode that is carrying a shaped electrode may be mounted in a floating manner, in particular in two or more independent spatial directions, and arresting elements may be provided for the kinematically determinate fixing of the at least one working electrode or the electrode carrier.

In another aspect, the closure (13, 18) may comprise an attachment element (15), which may be arranged in axial extension of the electrode carrier and may comprise a centering aid.

In yet another aspect of the arrangement, the at least one working electrode (5) may be mounted displaceably at least along one axis.

The present invention also provides an installation for the defined rounding or deburring of edges of electrically conductive components, in particular turbine parts, by electrochemical machining. The installation comprises at least one electrode arrangement of the present invention as set forth above (including the various aspects thereof), which arrangement is held in a holder, and further comprises a component mount (102) for mounting a component to be machined.

In one aspect, the electrode arrangement may comprise two or more working electrodes (5, 5', 5") arranged in parallel to one another, at least one of the two or more working electrodes being movable at least along one direction and/or rotatable about one or more independent spatial axes.

The present invention also provides an installation for the defined rounding or deburring of edges of electrically conductive components, in particular turbine parts, by electrochemical machining. The installation comprises a component mount (102) for mounting a component to be machined and a holder. The installation further comprises an electrode arrangement comprising two or more working electrodes (5, 5', 5") arranged in parallel to one another, at least one of the two or more working electrodes being movable at least along one direction and/or rotatable about one or more independent spatial axes.

In one aspect of the installations of the present invention set forth above, the component mount (102) may be rotatable and/or pivotable about one or more axes and/or displaceable along one or more independent spatial directions.

The present invention also provides a method for the defined rounding or deburring of edges of electrically conductive components, in particular turbine parts, by electrochemical machining. The method comprises providing at least one self-centering working electrode (5), introducing the at least one self-centering working electrode into a recess of a component to be machined and aligning it in relation to the component to be machined and, while an electrolyte and an electric current are being provided, moving it from a first distance from the component to a second, smaller distance from the component.

In one aspect of the method, the at least one working electrode may be moved at a rate of from 0.05 mm/min to 3 mm/min.

In another aspect, two or more working electrodes (5, 5', 5") arranged in parallel may be introduced simultaneously into recesses of the component to be machined.

In yet another aspect of the method, pulsed electric current may be used.

In a still further aspect, the component to be machined and/or the at least one working electrode may be provided with electrically insulating coverings (which preferably serve at the same time as electrolyte guiding elements).

In another aspect, the component to be machined may be provided with electrolyte guiding elements, in particular closure plugs for openings or cavities, which preferably at the same time are formed in an electrically insulating manner as coverings.

In another aspect of the method of the present invention, the at least one working electrode may be mounted in a floating manner and, in a first step, for centering with free mobility may be brought to bear against the component to be machined, whereupon, in a second step, the working electrode may be fixed and may subsequently be brought to the position at the first distance.

In a still further aspect of the method, the method may be carried out by using the electrode arrangement of the present invention as set forth above (including the various aspects thereof) and/or by using the installation of the present invention as set forth above (including the various aspects thereof).

The present invention provides an electrode arrangement for the defined rounding or machining, in particular deburring, of edges of electrically conductive components in which a tubular working electrode is provided, through which an electrolyte for carrying out the electrochemical machining is passed. The electrolyte may be, for example, an aqueous solution of $NaNO_3$ or $NaCl$ with a concentration of between 5% and 25% by weight.

In the case of the working electrode according to the invention, a closure is provided on the front end of a tubular electrode carrier of the working electrode, so that the electrolyte inflow line in the axial direction of the electrode carrier is closed. At the same time, however, at least one outlet opening is arranged in the radial direction, and correspondingly allows a direct electrolyte inflow to a laterally arranged component. In this way, exact machining of a component edge is possible.

In addition, a shaped electrode with the negative shape of the edge shape to be produced may be arranged on the working electrode or on the tubular electrode carrier in extension of the outlet opening, so that, as a result of the electric potential distribution that is brought about by the shaped electrode of the working electrode, the erosion on the component to be machined is performed in the way desired. In combination with the outlet opening for the electrolyte, it is ensured that sufficient fresh electrolyte liquid is present in the region of the shaped electrode.

This can be further enhanced by at least one sealing body being provided laterally on the closure to bear against the component to be machined, so that the outflow of the electrolyte along the component can be prevented by means of the sealing body and the electrolyte is forced to flow away in the region of the shaped electrode of the working electrode. In addition, the closure prevents machining or erosion in undesired regions of the component to be machined.

According to a further aspect of the present invention, for which protection is independently sought, the working electrode is formed in a self-centering manner, so that, when it is introduced into a recess of a component to be machined, a defined arrangement with respect to the component to be machined is automatically allowed.

To form a self-centering working electrode, the working electrode or the electrode carrier of a tubular working electrode that is carrying a shaped electrode may be mounted displaceably along at least one axis or spatial direction, preferably along a number of independent spatial axes. As a result, suitable positioning of the working electrode with respect to the component to be machined is obtained in an easy way. The floating mounting can provide in particular the mobility transversely to a direction along which the electrode is moved during operation in the direction of the component to be machined. In addition, there may be arresting means, which allow a kinematically determinate mounting of the working electrode or the electrode carrier. For example, these means may be clamping elements, in particular hydraulically or pneumatically actuable clamping elements.

With such a configuration of an electrode arrangement it is possible to mount the working electrode initially in a floating manner and, in this state of free mobility, to bring it to bear against the component to be machined. In this position, the working electrode centers itself with respect to the component to be machined and can then be arrested or fixed in this arrangement by the arresting means, so that then no further movement of the working electrode or the electrode carrier is possible in the mounting of the electrode arrangement. After fixing the working electrode or the electrode carrier, the electrode arrangement with the fixed working electrode is moved into a starting position for carrying out the machining and subsequently, during the machining, is adjusted to achieve a defined erosion on the component to be machined.

For the purpose of self-centering, the closure may have in axial extension of the electrode carrier an attachment element, which has a centering aid. For example, the attachment element may be formed in a tapering manner, for example in the form of a (truncated) cone, in order to ensure easy introduction and symmetrical alignment with respect to a recess of the component to be machined. For example, the recess may be formed by a blade root groove in a turbine disk or compressor disk.

An electrode arrangement may also have a number of working electrodes, which may be arranged parallel to one another.

An electrode arrangement may also be arranged in an installation for electrochemical machining with a corresponding holder for the electrode arrangement and a component mount for mounting a component to be machined, so that, according to a further aspect of the present invention, a corresponding installation is also claimed.

The holder of the electrode arrangement and/or the working electrodes of the electrode arrangement may be movable along a spatial direction, preferably along a number of independent spatial directions, and/or rotatable about one or more independent spatial axes. In the case of a number of working electrodes arranged parallel to one another, they may be correspondingly moved simultaneously parallel to one another. The mobility of the working electrodes ensures a suitable arrangement with respect to a component to be machined.

In addition, the component mount for mounting the component to be machined may likewise be rotatable and/or pivotable about one or more axes and/or displaceable along one or more independent spatial directions.

In addition, the electrode arrangement and/or the installation with the electrode arrangement may be set up in such a way that a defined lowering of the working electrode for setting a suitable working gap is possible.

This is so because the electrode arrangement or the installation is operated in such a way that the working electrode is first arranged at a first distance from the component and subsequently, while an electrolyte is being provided, is moved into a position at a second, reduced distance from the component by applying an electric current, in order to bring about the desired erosion of material on the component and the corresponding shaping.

The rate at which the working electrode is moved may lie here in the range of, for example, from 0.05 mm per minute to 3 mm per minute.

Before the electrochemical machining, at least one working electrode, preferably a self-centering working electrode according to the present invention, must be introduced into a corresponding recess of a component to be machined and be aligned in relation to the component to be machined, it being possible in the case of a number of working electrodes arranged in parallel for this to be performed simultaneously in one and the same movement.

The electrochemical machining may be performed by means of a pulsed electric current.

In order to avoid machining taking place in undesired regions on the component to be machined, electrically insulating coverings may be arranged on the component to be machined. Corresponding coverings may also be provided on the working electrode or the shaped electrode, in order to allow selective influencing of the electric potential distribution.

The electrically insulating coverings on the component to be machined and/or the working electrode may at the same time be formed as electrolyte guiding elements, in order to achieve a desired flow of the electrolyte through the working gap.

The components to be machined may be formed in particular from steel, nickel-based alloys or titanium alloys.

BRIEF DESCRIPTION OF THE DRAWINGS

The appended drawings show in a purely schematic way in

FIG. 8 a view of the installation from FIG. 4 turned through 90°; and in

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description in combination with the drawings making apparent to those skilled in the art how the several forms of the present invention may be embodied in practice.

Figure 1:
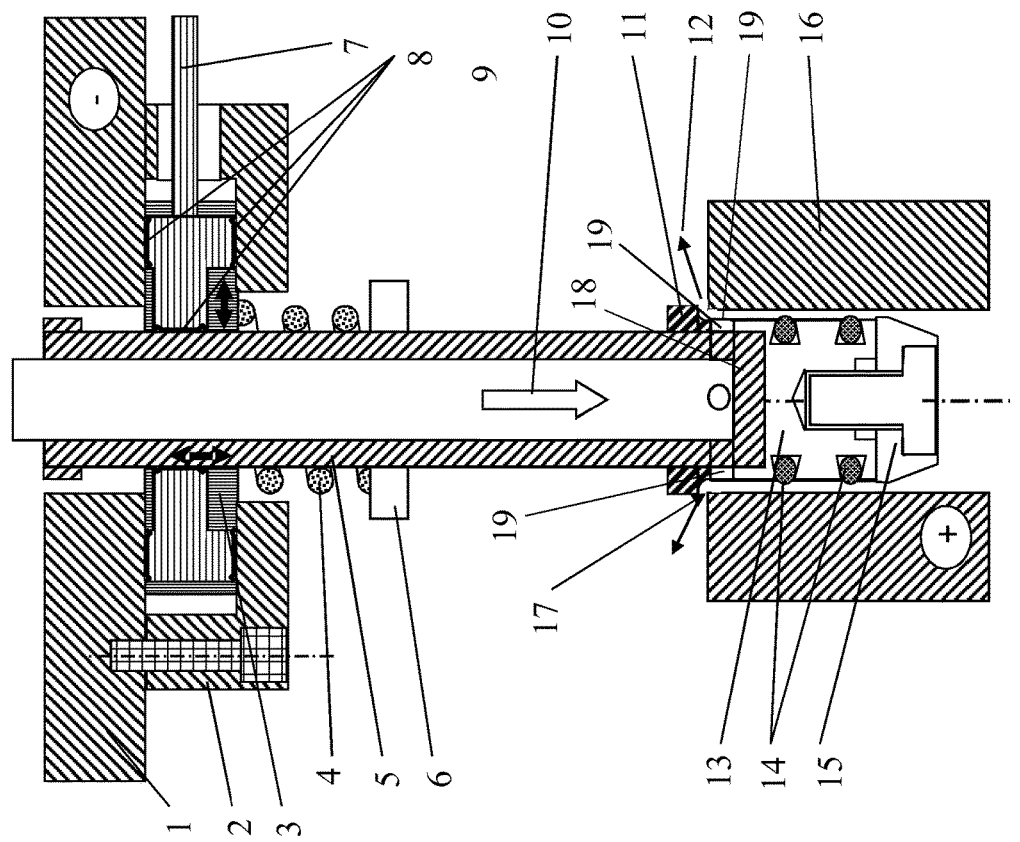
FIG. 1 a cross section through a first embodiment of a self-centering electrode for defined edge rounding by ECM.

FIG. 1 shows a cross-sectional view through a self-centering electrode for defined edge rounding by means of ECM (electrochemical machining).

The electrode has a mounting plate 1, on which a clamping bearing 2 is arranged by means of a screwed connection. The clamping bearing 2 holds a hydraulic clamping disk 3, by means of which a tubular working electrode 5 can be held with respect to the mounting plate 1. The hydraulic clamping disk 3 is mounted in a floating manner in the clamping bearing 2 and has a hydraulic feed 7, by means of which hydraulic oil can be pumped into the clamping disk. The clamping disk 3 has a number of membrane regions 8, which are formed such that they bear against the mounting plate 1, the clamping bearing 2 and the tubular electrode carrier of the working electrode 5. By applying a hydraulic pressure by means of the hydraulic oil, the membranes 8 are deformed outwardly, so that they press with the corresponding hydraulic pressure against the neighboring components, that is to say the mounting plate 1, the clamping bearing 2 and the electrode carrier of the working electrode 5. In this way, the working electrode 5 can be fixed with respect to the mounting plate 1, while the mounting plate 1 is arranged fixedly or movably in a corresponding system (see below), so that the position of the working electrode can be set in a defined manner.

The tubular electrode carrier of the working electrode 5, which serves as a carrier for a correspondingly formed shaped electrode or a sinker electrode 11, has at its end on which the sinker electrode 11 is arranged an end terminating plate 18, on the end of which a sealing and guiding piece 13 is arranged, to which in turn an attachment element 15 is attached by means of a screwed connection. The attachment element 15 is frustoconically formed and preferably formed from cemented carbide. Formed on the sealing and guiding piece 13, which may preferably be formed from ceramic or plastic, are grooves in which sealing rings 14 are provided. The sealing and guiding piece 13 and the attachment element 15 serve the purpose of introducing the working electrode 5 into a cavity to be machined by the sinker electrode 11. In the exemplary embodiment shown, this may be a blade root groove of a turbine disk 16. The sinker electrode 11 has a corresponding negative shape 17 of an edge rounding that is intended to be formed on the edges of the blade root groove in the disk 16. Correspondingly, the attachment element 15 with the sealing and guiding piece 13 serves for centering the sinker electrode in the middle of the blade root groove of the turbine disk 16. The bearing of the sealing rings 14 against the side edges of the groove allows a self-centering of the electrode because of the mobility of the electrode carrier of the working electrode 5 with respect to the mounting plate 1 and the clamping bearing 2 (see double-headed arrows).

For this purpose, the electrode carrier of the working electrode 5 is movably mounted in the clamping bearing 2, so that mobility transversely to the longitudinal axis is obtained in particular. The working electrode is then made to enter the groove to the extent that it comes to bear against the edge to be machined and the spring 4 is compressed by a small amount. This is followed by the hydraulic clamping of the electrode carrier and then the electrode arrangement with the firmly clamped electrode carrier is removed from the component to be machined, in order to produce a starting gap for the electrochemical machining. The self-centering of the electrode has the effect of setting a defined starting or neutral position of the working electrode. In this way, the sinker electrode 11 or the shaped electrode 11, which corresponds to the negative of the finished edges, is positioned exactly over the edge by aligning or centering longitudinally and transversely with respect to the axis of advancement, that is to say the longitudinal axis of the electrode, and can subsequently machine the edge electrochemically by an advancement into the recess of the clearing groove according to the double-headed arrow, the electrolyte necessary for the electrochemical machining running in a channel between the edge and the shaped electrode 11. During the machining, the exactly positioned working electrode or shaped electrode, which is no longer displaceable due to being clamped in its position, is lowered as the machining progresses, so that a consistent machining of the workpiece to be machined is obtained.

The electrode carrier of the working electrode 5, which defines an electrolyte inflow line 10, has between the terminating plate 18 and the sinker electrode 11 outlet openings 19, through which the electrolyte that is transported through the electrode carrier of the working electrode 5 in the direction of the sinker electrode 11 can emerge in order to fill the gap between the sinker electrode 11 and the blade root groove in the disk 16 with electrolyte. The sealing rings 14 prevent the electrolyte from being able to leave the gap between the working electrode and the blade root groove in any other way than through the gap that is formed by the sinker electrode 11. This ensures that the electrolyte that is pumped through the electrode carrier of the working electrode 5 in the direction of the sinker electrode 11 is present in the region of the sinker electrode 11 and can be used there for the electrochemical machining.

The working electrode 5 can move back and forth along its longitudinal axis according to the double-headed arrow shown, in order to change the gap between the sinker electrode 11 and the component to be machined, that is to say the disk 16. For displacing the working electrode 5 along its axial extent, a corresponding drive may be provided (not shown), bringing about the corresponding movement of the working electrode 5, and consequently of the sinker electrode 11, independently or in conjunction with the helical spring 4.

The self-centering electrode shown, for defined edge rounding by means of electrochemical machining (EMC), is then used in such a way that first a turbine disk 16 to be machined is positioned with respect to the electrode. Then, the attachment element 15 and subsequently the sealing and guiding piece 13 are threaded into the blade root groove of the turbine disk 16 to be machined, the working electrode 5 being displaceable with respect to the mounting plate 1 and the clamping bearing 2 by way of the corresponding setting of the hydraulic pressure on the clamping disk 3, so that a self-centering setting of the working electrode 5, and consequently of the sinker electrode 11, in the blade root groove of the turbine disk 16 to be machined is possible. After the threading-in and self-centering of the electrode, the working electrode 5 is then firmly clamped by means of the hydraulic clamping disk 3, it then only being possible for the working electrode 5 to be displaced along its longitudinal axis with the mounting plate 1, in order to bring about the electrochemical machining on the turbine disk 16 by a corresponding reduction of the gap in front of the sinker electrode 11, so that the desired rounding radius is set on the blade root groove of the turbine disk 16. The rate of advancement during the lowering may lie here in the range from 0.05 to 3 mm per minute.

Figure 2:
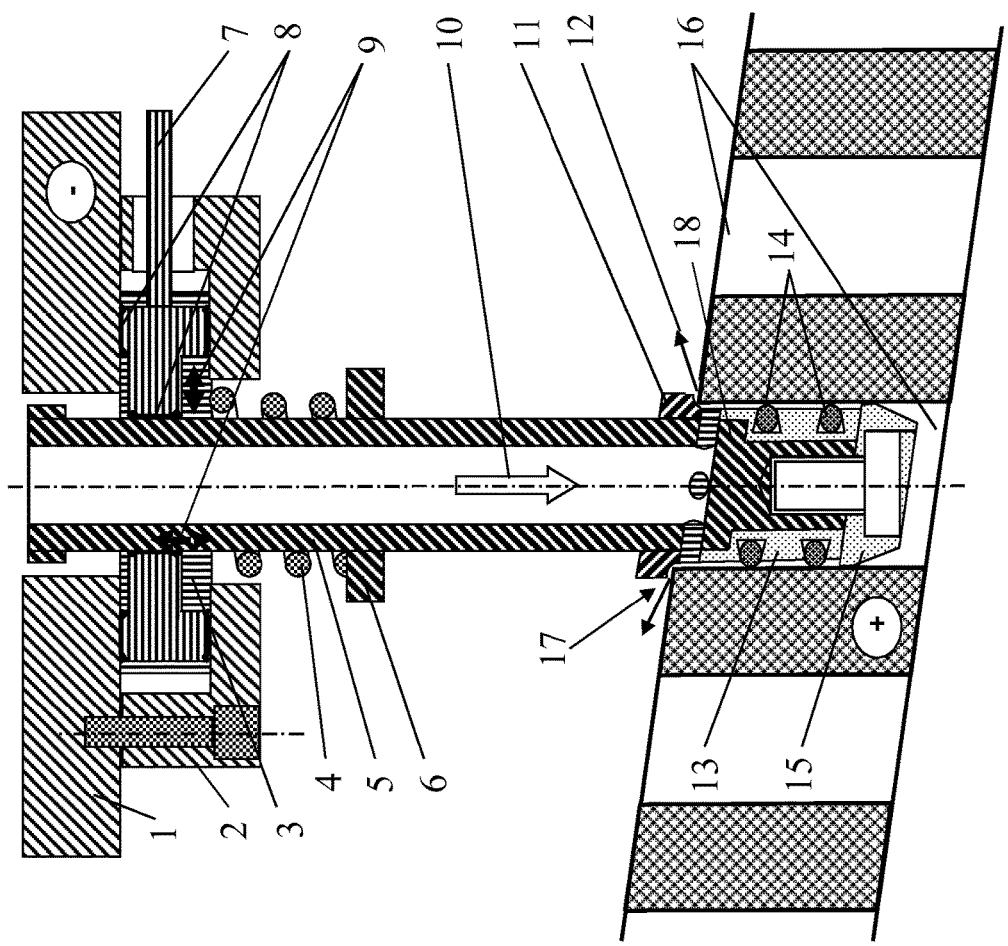
FIG. 2 a cross-sectional view of a second embodiment of a self-centering electrode for defined edge rounding by ECM.

FIG. 2 shows the self-centering electrode from FIG. 1 in another application. Instead of rounding the edges of a blade root groove in a turbine disk 16, in the case of which the blade root groove is formed perpendicularly to the end face of the turbine disk 16, the edges of obliquely extending blade root grooves are rounded in a defined manner, the blade root grooves being arranged at a specific angle with respect to the end faces of the turbine disk 16.

As FIG. 2 reveals, for this case the turbine blade 16 is also arranged at a corresponding angle with respect to the working electrode 5 or its longitudinal axis. The same angle is then provided in the case of the sinker electrode 11, and the attachment element 15 and also the terminating plate 18 and the sealing and guiding piece 13 have corresponding obliquely extending end faces, in order when introducing the electrode into the blade root groove to provide symmetrical conditions for the introduction and self-centering. Otherwise, the self-centering electrode of FIG. 2 is virtually identical to the embodiment of FIG. 1, so that the same reference numerals are used for the same components and an additional description of the identical components is not given. Only the arrangement of the sealing and guiding piece 13 and also of the terminating plate 18 of the working electrode 5 is implemented in a structurally different way. In the case of the embodiment of FIG. 2, the sealing and guiding piece 13 is formed as a sleeve and is placed on a cylindrical projection of the terminating plate.

Figure 3:
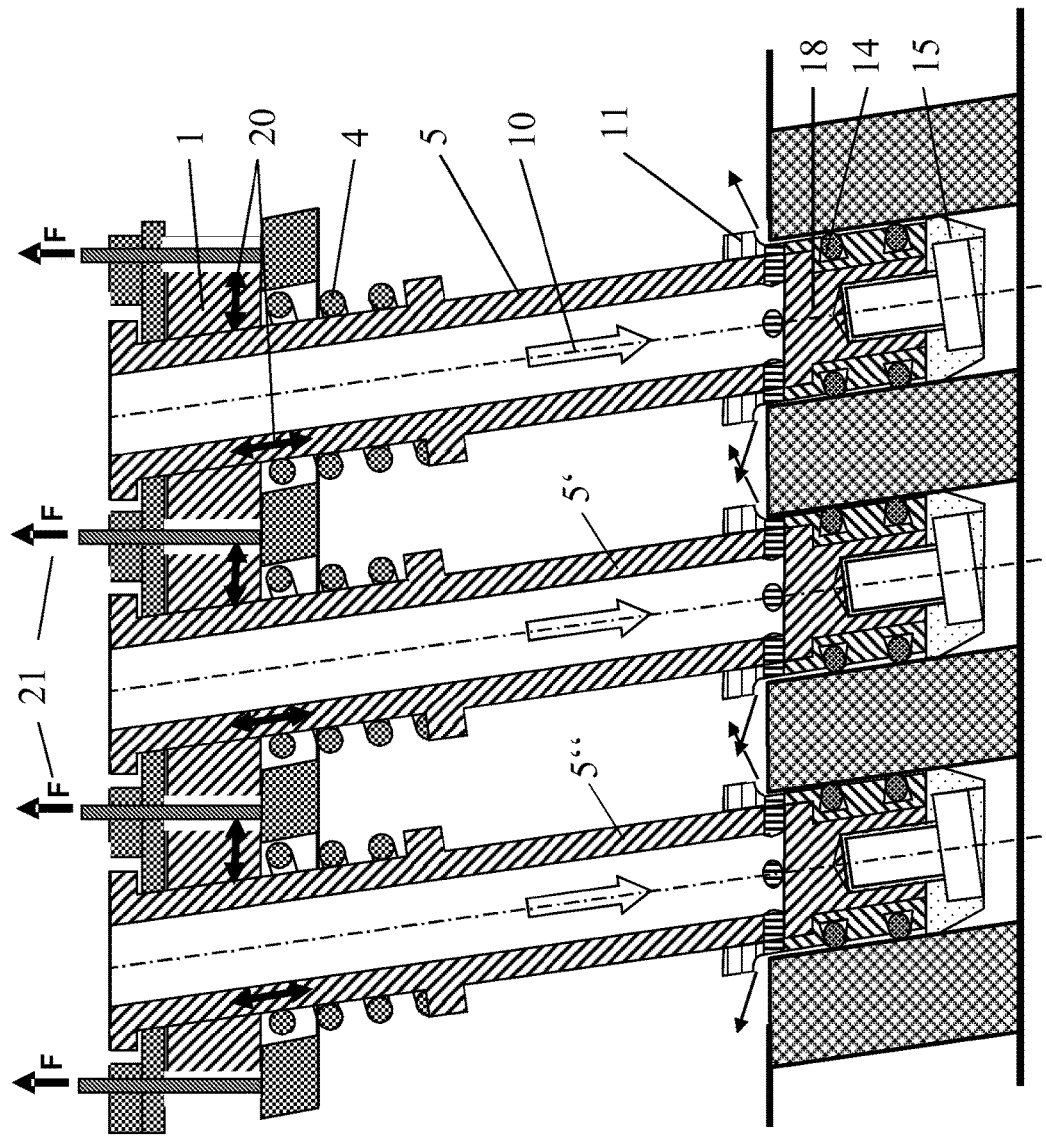
FIG. 3 a cross-sectional view of a third embodiment of self-centering electrodes for defined edge rounding by ECM, a number of electrodes being arranged in parallel.

FIG. 3 shows a further embodiment of an electrode arrangement for defined edge rounding by means of electrochemical machining (ECM). The embodiment shown in FIG. 3 already differs from the previous embodiments in that a number of parallel working electrodes 5, 5', 5" are provided instead of only a single working electrode, so that a number of blade root grooves of a turbine disk can be machined simultaneously. In addition, the floating mounting of the electrode carriers of the working electrodes 5, 5', 5" in the mounting plate 1 is not realized by hydraulic clamping disks, but by mechanical clamping arrangements, which however likewise allow a displacement of the working electrodes 5, 5', 5" transversely with respect to their longitudinal axes for the self-centering. The possibilities of movement are indicated by the double-headed arrows 20, while the arrows 21 indicate the clamping force. Otherwise, the structure of the individual electrodes is identical to the embodiments of FIGS. 1 and 2, so that in turn the same components are provided with identical reference numerals and are not described again here.

In the case of the exemplary embodiment shown, the component to be machined is arranged parallel to the mounting plate 1 of the working electrodes, which are arranged at an angle in the same. The angle corresponds to the obliquity of the blade root grooves in the component to be machined. The working electrodes are made to enter the blade root grooves by simultaneously turning and moving in the longitudinal direction, symmetrical conditions for the introduction and self-centering being obtained.

Figure 4:
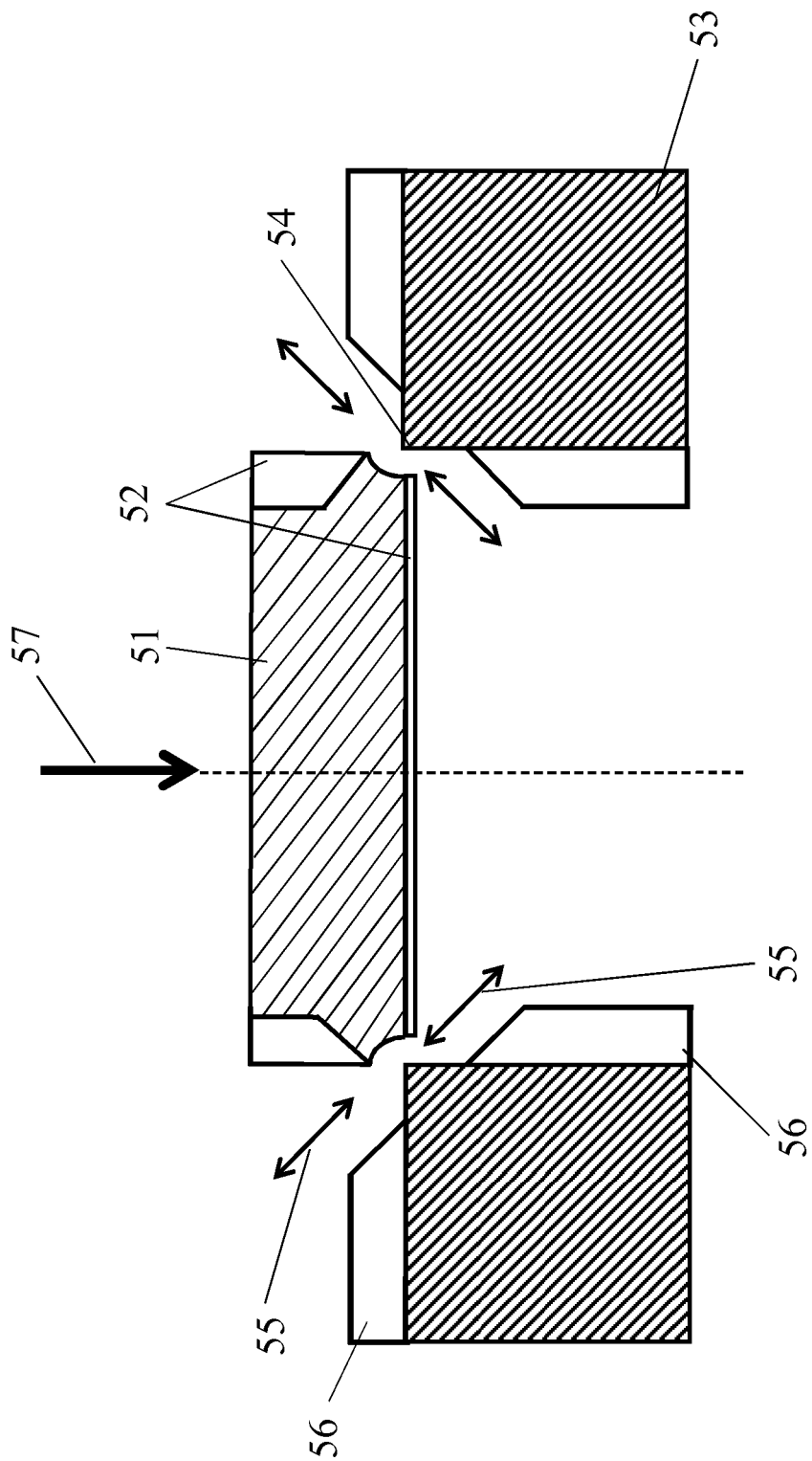
FIG. 4 a cross-sectional view of a further embodiment of a shaped electrode for the machining of edges in the example of a recess of a blade root groove in a turbine disk or compressor disk.

FIG. 4 shows in a cross-sectional view the arrangement of an electrode 51, which does not provide an electrolyte inflow through a tubular body. Instead, here the electrolyte is only introduced into the corresponding gap between the electrode 51 and the component 53 from the side. The electrode 51 has coverings 52, which are electrically insulating and only expose the electrode 51 at the edges, so that a specific potential distribution is established. Similarly, an arrangement of electrically insulating covering elements 56 is provided on the component 53 to be machined, on the one hand preventing undesired regions of the component 53 from being machined and on the other hand additionally defining together with the electrically insulating coverings 52 of the electrode 51 the directions of flow 55 of the electrolyte. The arrow 57 in turn indicates the direction of movement of the electrode 51 during the machining.

Figure 5:
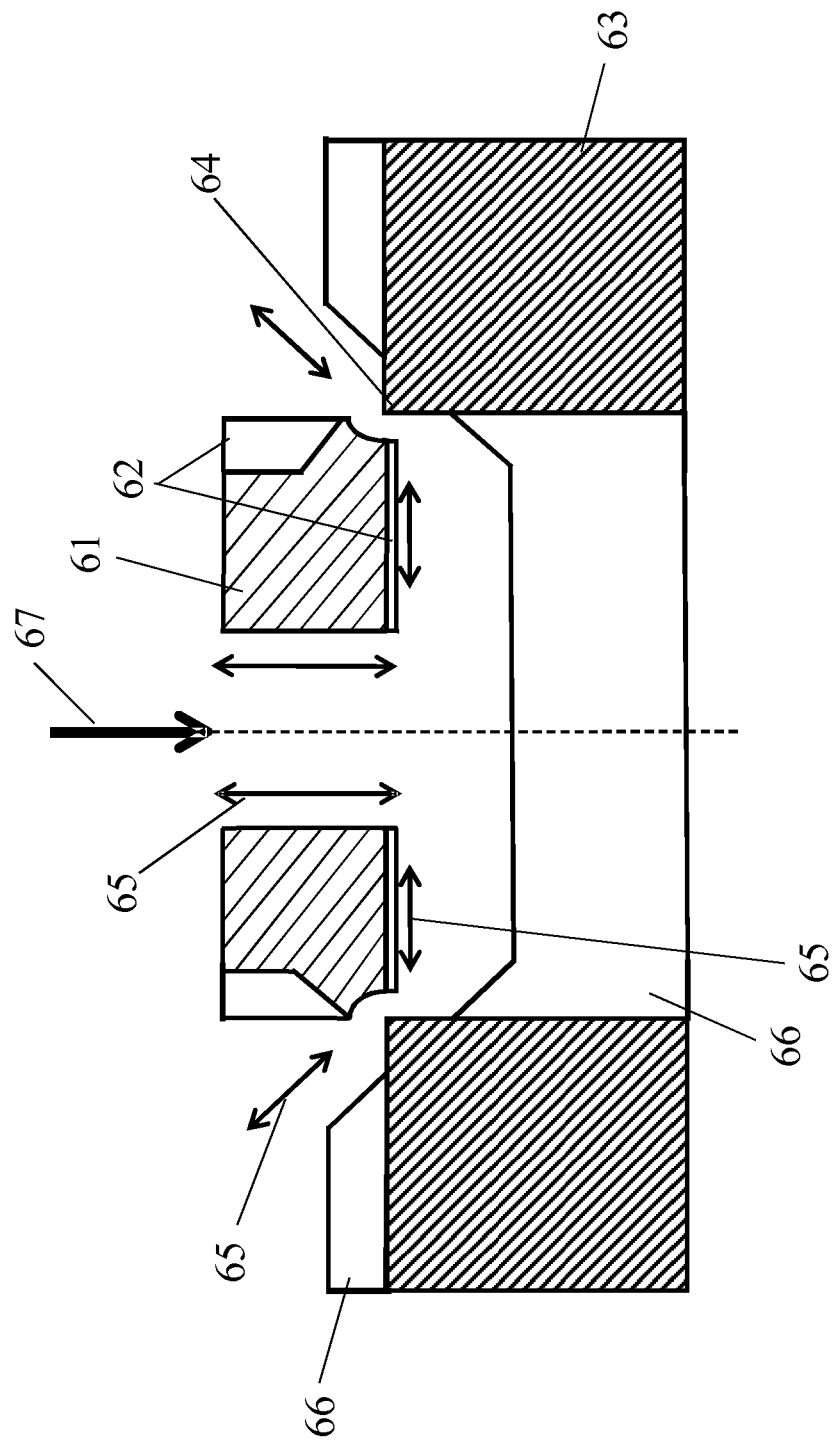
FIG. 5 a cross-sectional view of a further embodiment of a shaped electrode for the machining of clearing grooves in a turbine disk or compressor disk.

FIG. 5 shows a further example of machining similar to the exemplary embodiment of FIG. 4. However, here in turn an electrode 61 that allows an inflow of the electrolyte through a tubular form of the electrode is used. In a way corresponding to the embodiment of FIG. 4, electrically insulating covering elements 62 and 66 are respectively provided both on the electrode 61 and the component 63, in turn being involved in influencing the flow of the electrolyte in specific directions 65 and serving in addition for providing protection from chemical erosion. In particular, the opening in the component 63 between the edges 64 to be machined is completely closed by a plug. The arrow 67 indicates in turn the lowering movement of the electrode 61 during the machining.

Figure 6:
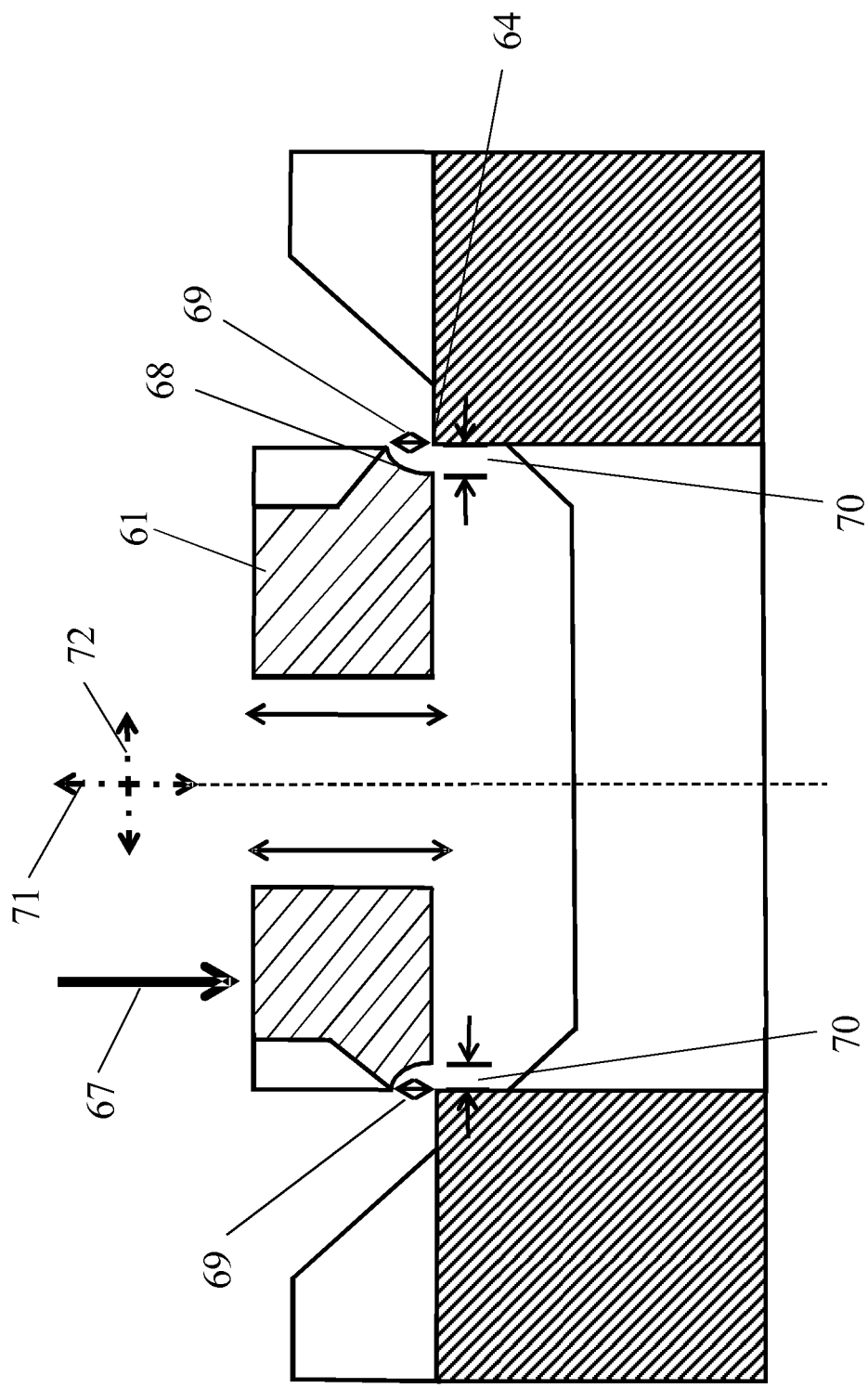
FIG. 6 an enlarged representation of the electrode from FIG. 5.

In FIG. 6, the situation from FIG. 5 is represented in greater detail and it is shown by the arrows 71 and 72 how the electrode 61 can be centered with respect to the component 63 to be machined or the edges 64 to be machined, only the lowering movement according to the arrow 67 that is necessary for the machining then being possible after the centering and fixing of the electrode 61 in its mounting. The double-headed arrows 69 and 70 show in detail the exact setting of the distances between the shaped electrode 68 and the edge 64, the shaped electrode 68 having here a corresponding round shape, which is intended to be transferred to the edges 64.

Figure 7:
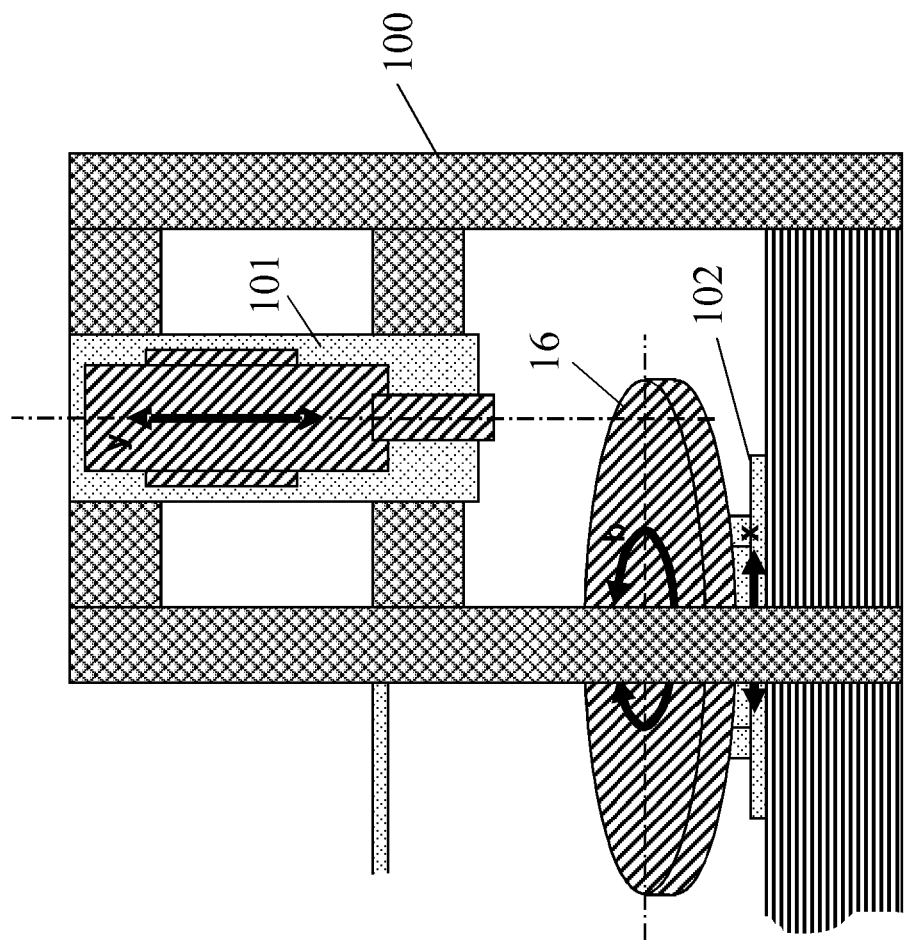
FIG. 7 a side view of a first installation for the machining of turbine disks.

FIG. 7 shows an installation for the electrochemical machining of turbine disks or compressor disks using electrodes such as those described in FIGS. 1 to 6.

The installation comprises a machine frame 100 and an electrode arrangement 101, as shown for example in the case of FIGS. 1 to 6. The electrode arrangement 101 or the corresponding working electrode is displaceable along a Y axis, so that the working electrode can be lowered and raised in the direction of the workpiece 16 to be machined. The workpiece in the form of a turbine disk 16 is arranged on a workpiece mounting 102, which allows a turning of the turbine disk 16 about its center axis and a tilting of the turbine disk 16 about an axis of rotation parallel to the horizontal, in order to be able to set an angle a with respect to the horizontal. In this way, the turbine disk 16 can, for example, be arranged obliquely with respect to the longitudinal axis of the tubular electrode carrier of the working electrode 5, as represented in FIG. 2.

Figure 8:
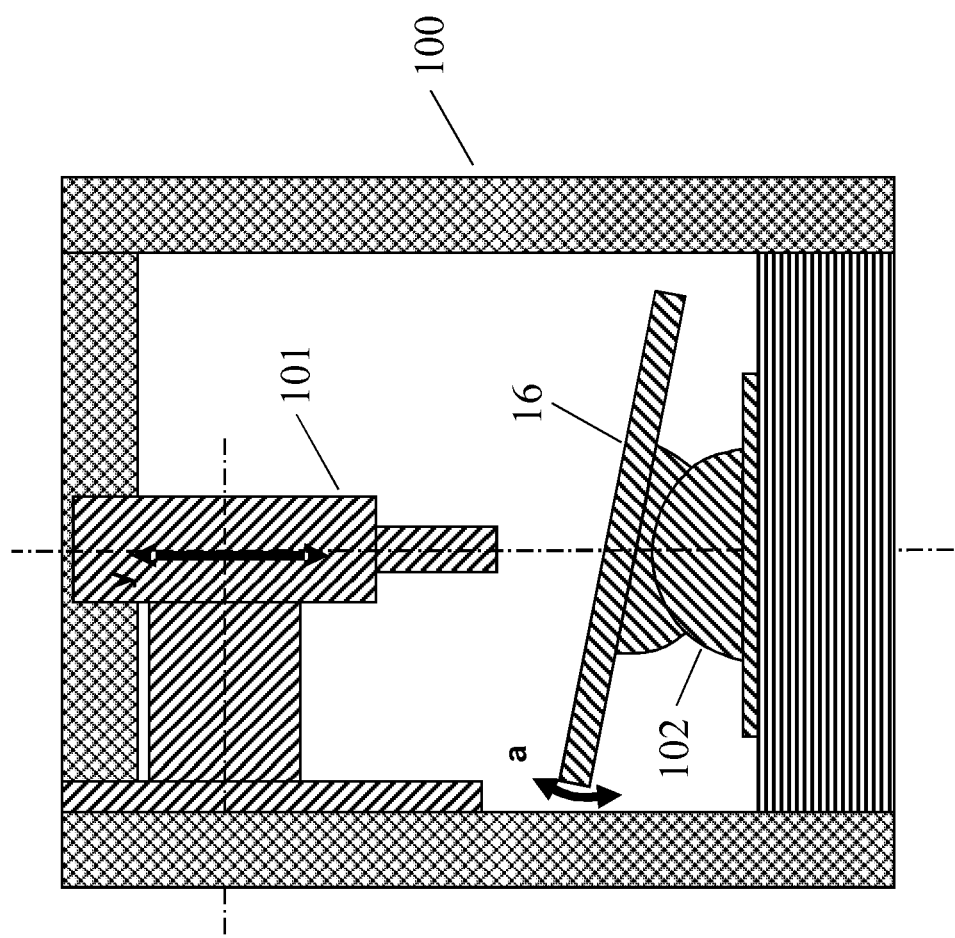

FIG. 8 shows a further embodiment of an installation for the electrochemical machining of turbine disks or other components, in which, for example, the electrode arrangement 105 of FIG. 3 is used. Since the working electrodes are aligned obliquely here, the electrode arrangement 105 can be moved in a multi-axial manner, and consequently can not only be moved back and forth along a Y axis, but also turned about the Y axis and, if need be, displaced along X and Z axes, which are transverse to one another and transverse to the Y axis, in order by a multi-axial movement to allow the oblique working electrodes of the electrode arrangement 105 to be introduced into obliquely extending blade root grooves for obliquely toothed blades. For this purpose, suitable holders 103, 104, 108 may be arranged on the machine frame 100.

Figure 9:
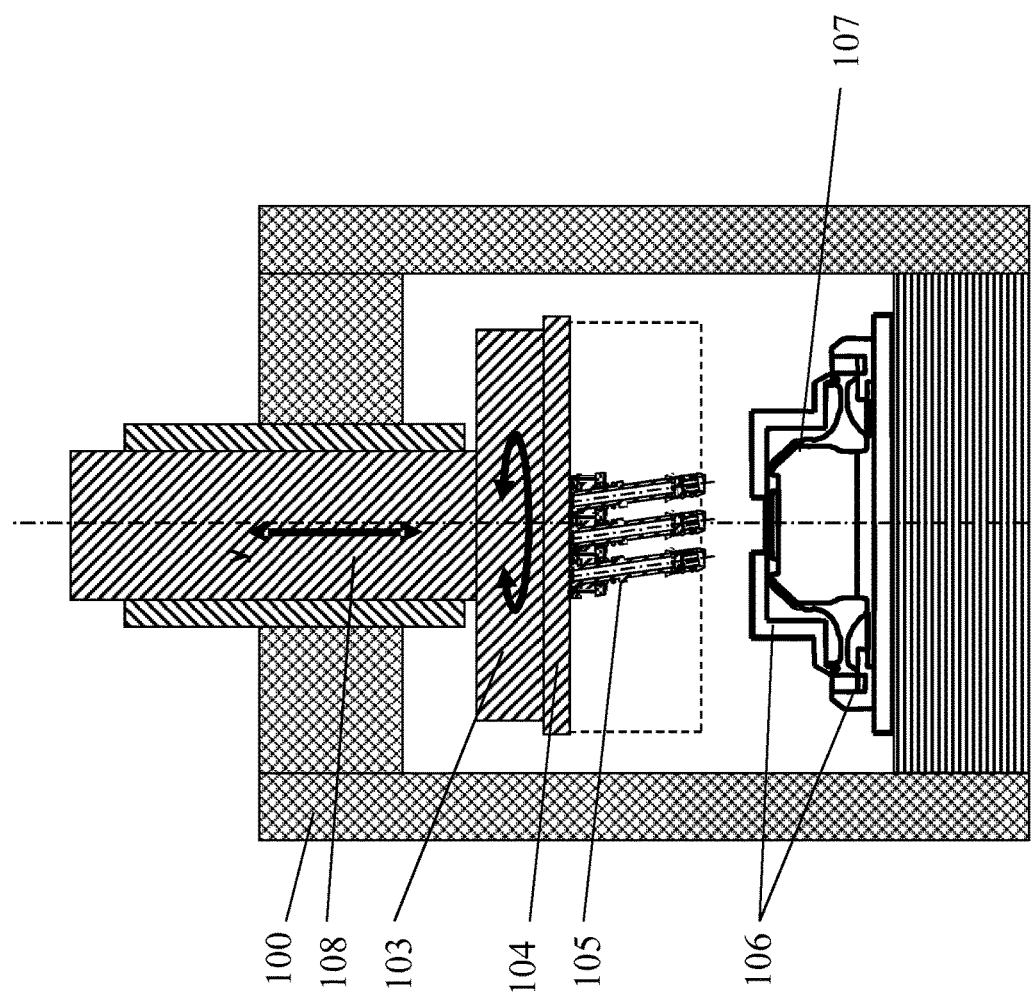
FIG. 9 a side view of a second embodiment of an installation for the machining of components by means of ECM.

In FIG. 9 there is also shown another example of a component 107 to be machined, in the case of which furthermore coverings 106 are provided for protecting the component.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. An electrode arrangement for the defined rounding or deburring of an edge of an electrically conductive component by electrochemical machining with at least one working electrode, wherein the at least one working electrode comprises a tubular electrode carrier through which an electrolyte inflow line is provided, the electrode carrier having on a front end thereof a closure that is arranged such that the electrolyte inflow line in an axial direction of the electrode carrier is closed, at least one outlet opening being arranged in a radial direction, and wherein the at least one working electrode has a negative shape of a shape of the edge to be rounded or deburred.

2. The electrode arrangement of claim 1, wherein the at least one working electrode is arranged on the electrode carrier above the at least one outlet opening.

3. The electrode arrangement of claim 1, wherein radially with respect to a longitudinal axis of the electrode carrier, the closure laterally has at least one sealing body to bear against a part of a component to be machined.

4. The electrode arrangement of claim 3, wherein the at least one sealing body is arranged in relation to the outlet opening and the shaped electrode such that, when it bears against the component to be machined, it prevents an outflow of an electrolyte between the component and the closure and forces the electrolyte to flow past the shaped electrode.

5. The electrode arrangement of claim 4, wherein the at least one sealing body comprises at least one sealing ring.

6. The electrode arrangement of claim 1, wherein the arrangement further comprises an attachment element which is arranged in axial extension of the electrode carrier at the closure end thereof and comprises a centering aid.

7. An electrode arrangement for the defined rounding or deburring of an edge of an electrically conductive component by electrochemical machining with at least one working electrode, wherein the at least one working electrode comprises a tubular electrode carrier through which an electrolyte inflow line is provided, the electrode carrier having on a front end thereof a closure that is arranged such that the electrolyte inflow line in an axial direction of the electrode carrier is closed, at least one outlet opening being arranged in a radial direction, wherein the at least one working electrode or the electrode carrier is mounted displaceably along more than one axis or spatial direction, and wherein the at least one working electrode has a negative shape of a shape of the edge to be rounded or deburred and is arranged on the electrode carrier above the at least one outlet opening.

8. The electrode arrangement of claim 7, wherein radially with respect to a longitudinal axis of the electrode carrier, the closure laterally has at least one sealing body to bear against a part of a component to be machined.

9. The electrode arrangement of claim 7, wherein the arrangement further comprises an attachment element which is arranged in axial extension of the electrode carrier at the closure end thereof and comprises a centering aid.

10. An electrode arrangement for the defined rounding or deburring of an edge of an electrically conductive component by electrochemical machining with at least one working electrode, wherein the at least one working electrode comprises a tubular electrode carrier through which an electrolyte inflow line is provided, the electrode carrier having on a front end thereof a closure that is arranged such that the electrolyte inflow line in an axial direction of the electrode carrier is closed, at least one outlet opening being arranged in a radial direction, and wherein the at least one working electrode or the tubular electrode carrier is mounted in a floating manner, arresting elements are provided for a kinematically determinate fixing of the at least one working electrode or the electrode carrier, and wherein the at least one working electrode has a negative shape of a shape of the edge to be rounded or deburred.

11. The electrode arrangement of claim 10, wherein radially with respect to a longitudinal axis of the electrode carrier, the closure laterally has at least one sealing body to bear against a part of a component to be machined.

12. The electrode arrangement of claim 10, wherein the arrangement further comprises an attachment element which is arranged in axial extension of the electrode carrier at the closure end thereof and comprises a centering aid.

13. The electrode arrangement of claim 10, wherein the at least one working electrode or the tubular electrode carrier is hydraulically mounted in a floating manner.

14. An installation for the defined rounding or deburring of an edge of an electrically conductive component by electrochemical machining, wherein the installation comprises at least one electrode arrangement of claim 1, which arrangement is held in a holder, and a component mount for mounting a component to be machined.

15. The installation of claim 14, wherein the electrode arrangement comprises two or more working electrodes arranged in parallel to one another, the two or more working electrodes being at least one of movable at least along one direction and rotatable about one or more independent spatial axes.

16. An installation for the defined rounding or deburring of an edge of an electrically conductive component by electrochemical machining, wherein the installation comprises at least one electrode arrangement of claim 7, which arrangement is held in a holder, and a component mount for mounting a component to be machined.

17. The installation of claim 16, wherein the electrode arrangement comprises two or more working electrodes arranged in parallel to one another, the two or more working electrodes being at least one of movable at least along one direction and rotatable about one or more independent spatial axes.

18. An installation for the defined rounding or deburring of an edge of an electrically conductive component by electrochemical machining, wherein the installation comprises at least one electrode arrangement of claim 10, which arrangement is held in a holder, and a component mount for mounting a component to be machined.

19. The installation of claim 18, wherein the electrode arrangement comprises two or more working electrodes arranged in parallel to one another, the two or more working electrodes being at least one of movable at least along one direction and rotatable about one or more independent spatial axes.

* * * * *